Dec. 18, 1962 H. M. GIEPEN 3,068,576

PANTOGRAPH ENGRAVER

Filed April 29, 1953 7 Sheets-Sheet 1

Inventor
Hubert M. Giepen
by Roberts, Cushman & Grover
Att'ys.

Dec. 18, 1962 H. M. GIEPEN 3,068,576

PANTOGRAPH ENGRAVER

Filed April 29, 1953 7 Sheets-Sheet 2

Inventor
Hubert M. Giepen
by Roberts, Cushman & Grover
att'ys.

Dec. 18, 1962 H. M. GIEPEN 3,068,576

PANTOGRAPH ENGRAVER

Filed April 29, 1953 7 Sheets-Sheet 3

Inventor
Hubert M. Giepen
by Roberts, Cushman & Grover
Att'ys.

Inventor
Hubert M. Giepen
by Roberts, Cushman & Grover
Att'ys.

Dec. 18, 1962 H. M. GIEPEN 3,068,576

PANTOGRAPH ENGRAVER

Filed April 29, 1953 7 Sheets-Sheet 5

Inventor
Hubert M. Giepen
by Roberts, Cushman & Grover
att'ys.

Dec. 18, 1962 H. M. GIEPEN 3,068,576

PANTOGRAPH ENGRAVER

Filed April 29, 1953 7 Sheets-Sheet 6

Inventor
Hubert M. Giepen
by Roberts, Cushman & Grover
Att'ys.

Inventor
Hubert M. Giepen
by Roberts, Cushman & Grover
Attys.

United States Patent Office 3,068,576 Patented Dec. 18, 1962

3,068,576

PANTOGRAPH ENGRAVER

Hubert M. Giepen, Cohasset, Mass., assignor to Red Mill Company, Boston, Mass., a partnership Filed Apr. 29, 1953, Ser. No. 351,943
13 Claims. (Cl. 33—23)

This invention relates to engraving machines and more especially to pantograph operated machines of semi-automatic construction.

The principal object of the invention is to provide a machine for automatically engraving indicia on name plates, identification tags and the like so that an unskilled operator may make an engraving comparable in composition, uniformity and precision to that produced by skilled engravers. A further object is to provide a machine which is especially suitable for distribution in local hardware stores and chain retail stores either for employer operation or for operation by the general public, in which latter case the machine would be provided with a suitable coin control. Another object is to provide a machine for engraving plates or identification tags very quickly so that the customer can purchase and have the finished work within a few minutes and at a very nominal cost. A further object is to provide a machine which is substantially foolproof in operation in that the control means for effecting the successive operations in making an engraving are arranged to prevent injury or damage to the parts even though accidentally operated in improper sequence. A further object is to provide a machine which will perform satisfactorily without damage to the parts and/or spoiling the clarity and precision of the engraving regardless of whether the operator is meticulous in carrying out the various operations in their proper sequence or whether careless and forces the operation of the machine. Further objects are to provide for abrupt movement of the cutting tool out of contact with the plate to be engraved so that sharp, clean lines are maintained and no defacing of the adjacent surface is possible, automatic spacing and back spacing of the successive indicia in a given line, line spacing and adjustment of line spacing, automatic delivery of plates to the place of engraving and delivery of the finished engraved plate to a place where it may be retrieved.

As herein illustrated, pantograph arms carrying a copy stylus and cutting tool are arranged on a suitable support with reference to a plate of support for a plate to be engraved by the cutting tool and a place of copy with which the stylus may be engaged. In keeping with the desirability of making clean, sharp engravement and to eliminate the possibility of scoring the adjacent surfaces of the plate by slight movement of the pantograph mechanism as the tool is entering or leaving the work, the pantograph, cutting tool and stylus are movably supported with reference to the place of engraving and place of copy for controlled movement to and from the same. Control is afforded by the stylus which is constructed and arranged so that it must be entered into the copy thereby locking the pantograph mechanism and hence fixing the position of the cutting tool before the tool is moved into engagement with the plate to be engraved and so that the elevation of the tool from the plate will necessarily precede clearance of the stylus from the copy. The movement of the support is attained by a motor driven high point cam operation of which is initiated by a microswitch on the stylus arm. The microswitch is actuated after the stylus arm has entered the copy to bring the support slowly into a depressed position and to enter the tool gradually into the work, and to hold it depressed until the stylus is lifted away from the copy whereupon the cam is rendered inoperative and spring means restores the support rapidly to its initial position. The position of the cutting tool is controlled by a timing cam mounted on cam shaft. The timing cam controls a microswitch which is in series with the microswitch on stylus arm. This arrangement controls in a precise fashion the cutting tool positions.

At the place of copy there is a movable support in the form of a copy disk having indicia arranged circumferentially of its edge, the disk being rotatable about its axis to bring any selected one of the indicia into the place of copy for engagement of the stylus therewith. In order to insure accuracy of copy, a lock is associated with the disk and is operable as the stylus is depressed to a copy position to engage the lock with the disk so that it can not be rotated during the engraving operation. Further provision is made for normally keeping the lock engaged with the disk when the machine is not energized.

The plates to be engraved are supplied from a magazine and are automatically delivered therefrom by plate transfer means to the place of engraving. The magazine is of the turret type having a plurality of circumferentially spaced compartments in which are vertically stacked plates and is rotated to bring each compartment in turn into a predetermined place of plate deposit. One end of the transfer means is located at said place of deposit for receiving the lowermost plate and moving it to the place of engraving. At the place of engraving the transfer is operable by suitable means to lock the plate at this place rigidly against lateral movement. Operation of the plate transfer to supply a fresh plate for engraving is accompanied by release and rejection of a completed plate. A delivery chute arranged next to the place of rejection receives the plate and gravitationally conducts it to a receptacle accessible from the outside of the machine. As the plate descends along the chute means is operable by its passage to render the machine inoperative until the primary circuit supplying operating current to the machine is reenergized. The support for the magazine and plate transfer means are mounted on a carriage which is moved rectilinearly and there is means for automatically moving the carriage laterally to space indicia along horizontal lines, and means for shifting it longitudinally to secure line spacing, said means being operable to back space and reset the lines. Indicators connected to the indicia spacing and line spacing means are provided for showing the position of the carriage at any given time with respect to the plate. Other and additional novel and advantageous features of the machine will appear hereinafter by reference to the accompanying drawings wherein:

Figure 1:
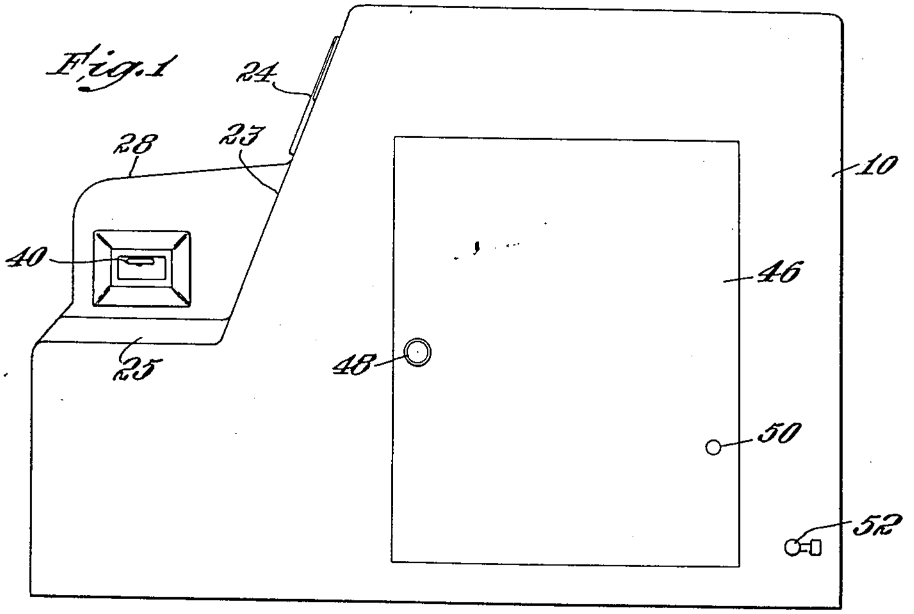
FIG. 1 is a side elevation of the machine.
Figure 2:
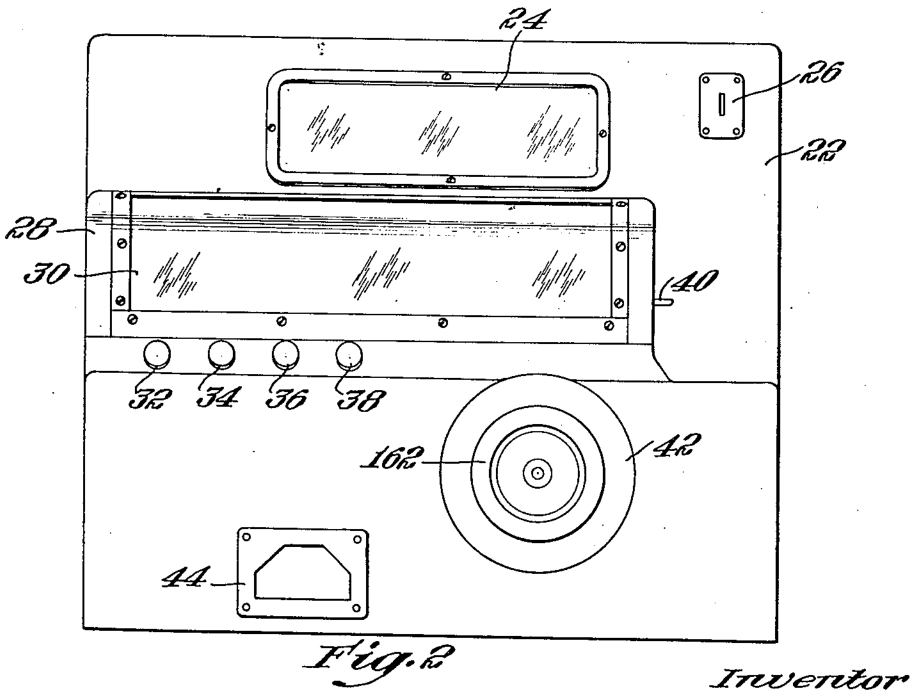
FIG. 2 is a front elevation of the machine.

Referring to FIGS. 1 and 2, the machine has a substantially cubical housing 10 comprised of plywood or sheet metal having a top, sides, front and back and attached to a flat base 12, the lower edge of the housing preferably fitting over the sides and ends of the base 12 and being secured thereto by suitable screws or bolts. The operative mechanism within the housing (FIG. 3) comprises essentially a pantograph 14 carrying a cutting tool 16 for hobbing the surface of a plate to be engraved, a tracing stylus 18 movable in conjunction with copy to effect movement of the cutter and a magazine and plate transfer 20 for supplying plates to be engraved to a place to be operated upon by the cutting tool. The front 22 of the housing 10 is stepped back from the lower portion so as to provide an inclined face 23 and horizontal face 25. The inclined face 23 has in it a substantially rectangular opening 24 covered with a transparent panel through which the operator may observe the plate and the cutting tool operating thereon. The sloping front also has in it a coin slot 26 for receiving a coin of suitable denomination to initiate operation of this machine in the event that it is to be coin operated. At the bottom of the inclined portion there is erected on the horizontal face 25 a blister 28, the top and front side of which is constituted by a one piece curved transparent panel 30 through which is visible a flat plate on which is printed instructions for the operation of the machine and indicators for visually showing the selected indicia and its position with respect to the plate. In the lower part of the front wall of the blister are pushbutton controls 32, 34, 36 and 38 which respectively control line selection, letter spacing, letter back spacing and plate release of the finished plate. At the right hand end of the blister a handle 40 projects through the wall which may be manipulated to control the stylus as will appear hereinafter. In the lower front part of the base there is located a hand wheel 42 for moving selected indicia into position for cooperation with the stylus and a plate discharge opening 44 through which finished plates may be withdrawn from the casing. In the right hand end wall of the housing is a door 46, which may be removed to give access to the inside of the housing, which is normally fastened in place by a key operated lock 48. The door has mounted on its inner side a coin-receiving mechanism which operates when a coin is dropped into the coin slot 26 to energize the operating current of the machine. A coin return button 50 is mounted on the door for returning non suitable coins. A switch 52 is also located on the end wall to turn on and off the line current after the machine has been plugged into the line.

Figure 3:
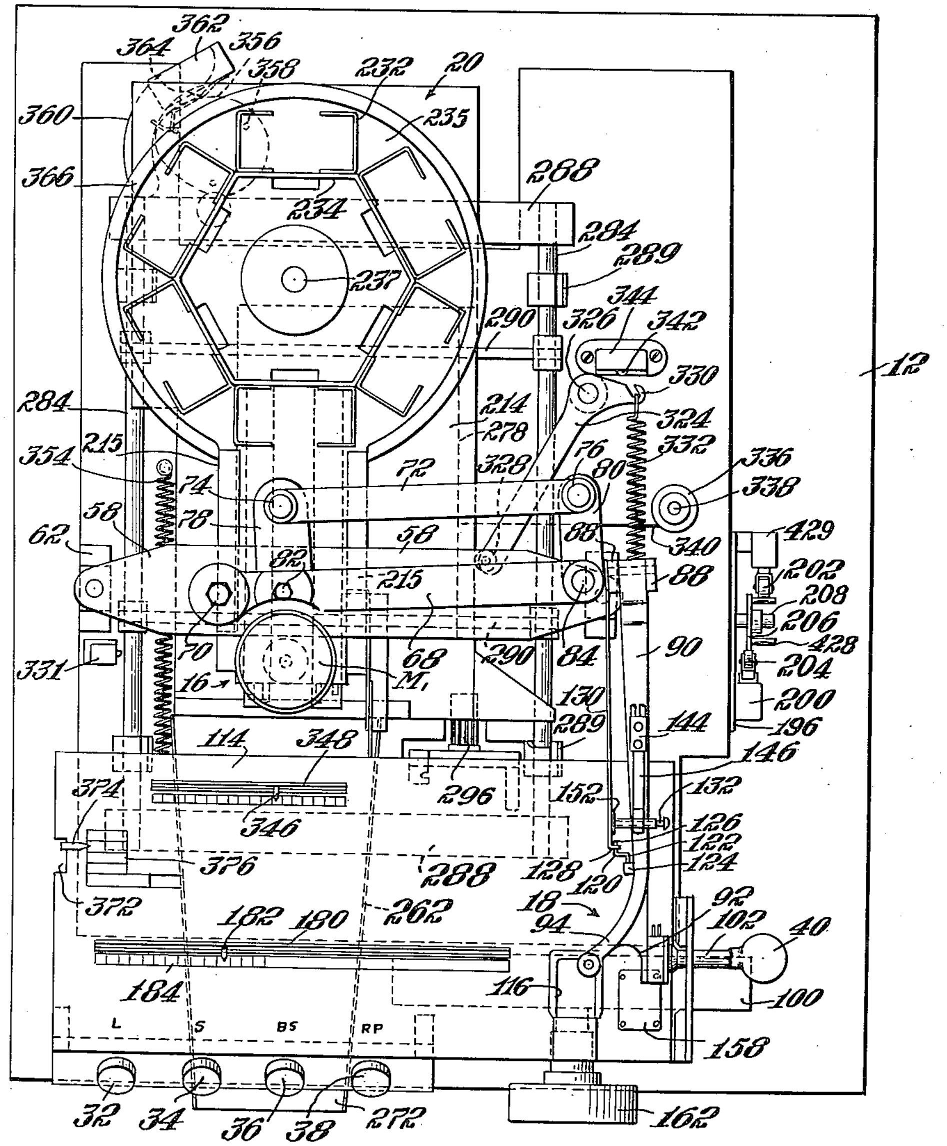
FIG. 3 is a plan view of the machine with the housing removed.
Figure 5:
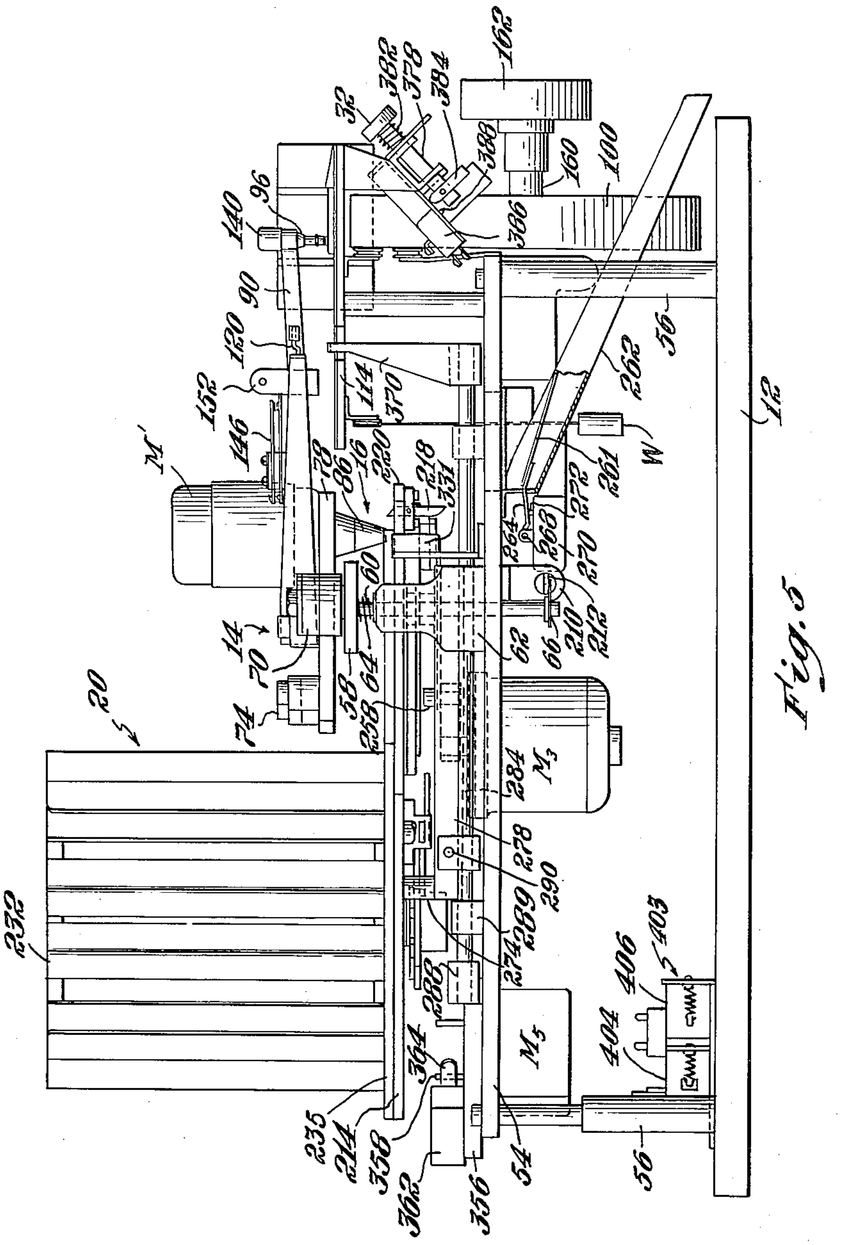
FIG. 5 is a side elevation with the housing removed as seen from the left-hand side of FIG. 3.
Figure 6:
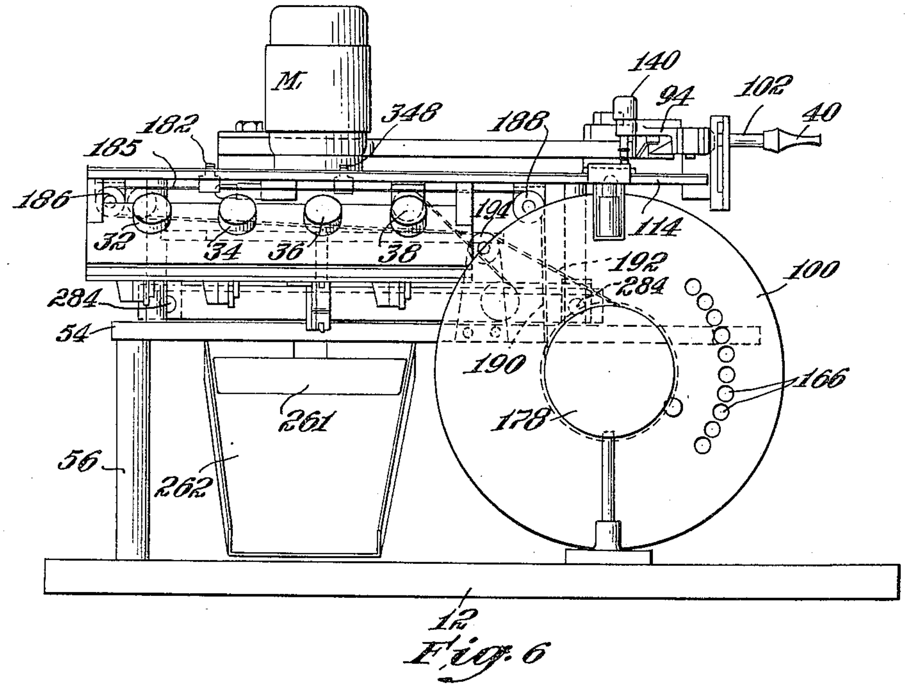
FIG. 6 is a front elevation of the machine with the housing removed.
Figure 10:
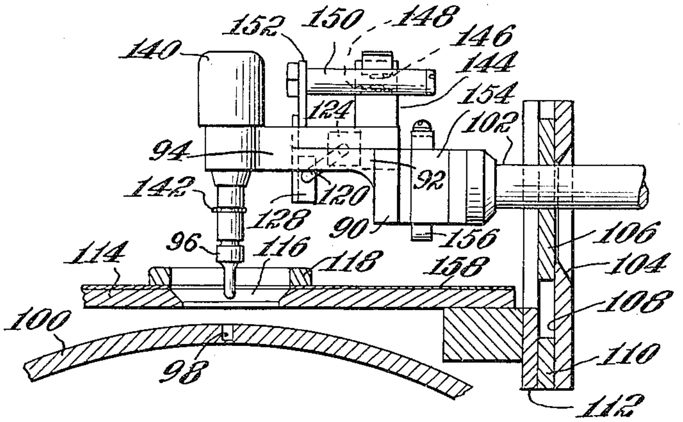
FIG. 10 is a fragmentary front elevation of the stylus and mounting thereof partly in section.
Figure 11:
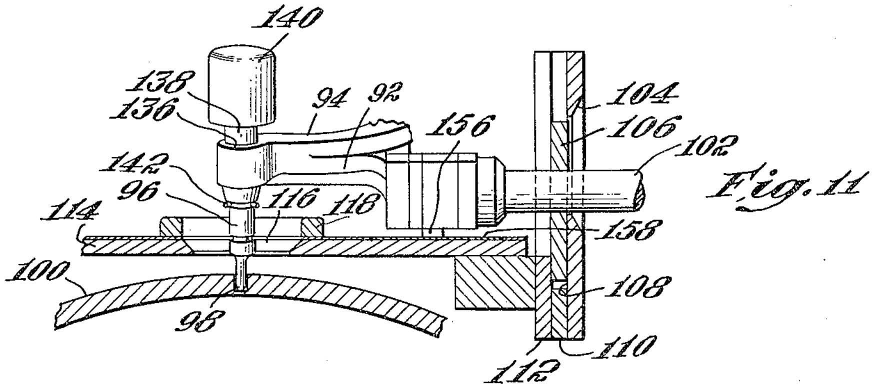
FIG. 11 is an elevation of the stylus in an operative position.

The pantograph, cutting tool, tracing stylus and magazine are supported by a chassis 54 (FIGS. 5 and 6) elevated above the base 12 on posts 56, there being four in number. On the chassis 54 there is mounted transversely thereof a flat bar 58 (FIGS. 3 and 5), to the opposite ends of which there are fastened rods 60 (FIG. 5) which are vertically slidable in brackets 62 fast to the opposite sides of the chassis 54 so that the bar is movable vertically with respect to the chassis. Springs 64 surround the rods and yieldably hold the bar 58 elevated, their ends bearing on the underside of the bar and the tops of the brackets. The rod 60 at one end of the bar, the left end as shown in FIGS. 3 and 5, extends downwardly through the bracket below the chassis 54 (FIG. 5) and has fast to it a forwardly extending arm 66, for a purpose which will be described hereinafter. The pantograph is mounted on the flat yieldable bar 58 and, as shown in FIG. 3, consists of an arm 68 pivoted at its left end at 70 on the flat bar 58 and an arm 72 parallel to the arm 68 which is connected thereto to form a rectangular linkage. As illustrated the arm 72 is pivotally connected at 74 and 76 to a pair of links 78 and 80 and these in turn are pivotally connected to the arm 68 at 82 and 84. The link 78 extends forwardly of the pivot point and has mounted on it a motor M1 which is made fast thereto. The motor shaft extends downwardly to the underside and has fast to it a chuck 86 in which is clamped a cutting tool in the form of a router for engraving a plate which is fixed below the tool as will appear hereinafter. While the motor M1 for driving the cutting tool is shown mounted on the pantograph alternatively it could be mounted on a fixed part of the chassis and a belt or other flexible drive employed to operably connect it to the tool on the pantograph. At the right hand end of the linkage there is attached to the forward end of the link 80 a bracket having a pair of vertical, spaced ears 88 between which there is pivotally supported a stylus arm 90 which extends forwardly from its pivot point and has at its forward extremity (FIG. 3) branches 92 and 94. The branch 94 (FIGS. 10 and 11) loosely supports a stylus pin 96, the lower end of which is adapted to enter the copy which as here shown is in the form of a groove 98 (FIGS. 10 and 11) of suitable configuration made in the peripheral surface of a copy disk 100. The copy disk carries a series of indicia in the form of letters of the alphabet and the numerals from 0 to 9, although it is to be understood that any other indicia might be formed on the surface of the cylinder, and by tracing the groove with the stylus the pantograph arms described above will produce a corresponding movement of the cutting tool so as to make a corresponding character in the plate to be engraved. As here illustrated the pantograph reduces the size or scale of the indicia, the copy being larger than the engraved indicia so as to facilitate tracing. Movement of the stylus is effected by a rod 102 (FIGS. 3, 10 and 11) fast to the branch 92 which extends laterally through the right end wall of the blister and terminates in a handle grip 40. To permit vertical sliding movement an opening 104 larger than the handle is made in the end wall of the blister through which the rod 102 passes thus permitting vertical movement of the handle. To prevent access of dirt and other foreign matter through the hole, a closure plate 106 preferably of fiberboard is mounted on the rod so as to cover the opening 104 on the inside and is slidably held in contact therewith in a groove 108 formed by spacers 110 (FIGS. 10 and 11) and a cover plate 112 made fast to the inside of the wall of the blister. Thus, as the rod is raised and lowered the plate 106 will slide in the groove vertically so as to keep the opening 104 closed at all times and yet allow perfect freedom of movement of the rod. Mounted inside of the blister within an opening in the horizontal wall 25 is a horizontal plate 114 (FIG. 3) to which is fastened the instruction plate and other indicating scales and pointers referred to above. The plate 114 (FIGS. 3, 10 and 11) has an opening 116 in it directly above the top of the copy disk 100 which is surrounded by a rim 118. The stylus pin 96 is movable through this opening into contact with the copy. FIGS. 10 and 11 illustrate the elevated inoperative position of the stylus pin and the depressed operative position respectively.

It is desirable to positively hold the stylus pin either in its elevated inoperative position or in its depressed operative position and to have its movement from one position to the other in the nature of a positive snap action so that it is perfectly clear to the operator when it is moved from one position to the other and to make it difficult to hold it in a position intermediate either its inoperative or its operative position so that malicious operation is discouraged. Snap action is provided for by a spring biased toggle or eccentric arrangement in the form of a crank 120 (FIGS. 3 and 10), one end 122 of which is pivoted in a block 124 fast to the stylus arm and the other end 126 of which is pivoted in the bent extremity 128 of a flat spring 130, the spring 130 being fastened on edge at its opposite end to one of the ears 88—88, so that its tendency is to exert a force on the crank in a direction to throw it one way or the other about its dead center. By pressing downwardly on the handle 40, the stylus arm 90 biases the crank below its center of rotation in the fixed end of the spring and by lifting on the handle 40 the reverse action takes place. A stop pin 132 (FIG. 3) set through the stylus arm 90 limits the movement of the spring 130 toward the arm. The branch 94 has at its extremity a vertical hole 136 (FIGS. 10 and 11) in which the stem 138 of the stylus pin is vertically slidable. The upper end of the stem carries a head 140 which is weighted so that when the stylus arm is elevated the stylus pin is held in its lowermost position (FIG. 10), the head resting on the top of the arm. Below the arm there is mounted on the stem a retaining ring 142 which limits upward movement of the stylus by contact with the underside of the arm. When the stylus arm is lowered toward operative position contact of the stylus pin tip with the bottom of the copy groove limits the downward movement of the stylus but at the same time permits the stylus arm to be moved further down by the distance from the underside of the arm to the ring 42. The purpose for this construction is to make sure that the stylus actually enters the copy groove before the cutting tool is brought into contact with the plate to be engraved and to make sure that the cutting tool is retracted before the stylus pin is moved completely out of the copy groove. To effect such operation there is mounted on the stylus arm a microswitch 144 (FIGS. 3, 10 and 11), suitably connected into an electric circuit which will be described hereinafter which has a pair of contact blades 146 and 148 (FIG. 4) normally held in contact with each other by the natural elasticity of the blades. The lower blade 148 has a V-shaped groove pressed into it through which extends a pin 150 fast at one end to a bracket 152 which in turn is fast to the spring 130 (FIG. 3) so that its vertical position is fixed. The switch 144 is operable by closing of the contact blades 146 and 148 to supply current to the motor M1 which rotates the cutting tool. Accordingly, when the stylus is lowered by downward pressure applied to the handle 40, the blade 148 moves out by contact with the pin 150 which allows the blades to close by their natural resiliency thus supplying current to the motor M1 so as to bring the cutting tool up to its cutting speed promptly. During this time, however, the bar 58 on which is supported the pantograph arms, the motor and cutting tool is held elevated by the springs 64 so that the cutting tool is held out of contact with the plate to be engraved. Lowering of this bar 58 to bring the cutting tool into contact with the work after the motor comes up to speed, is controlled by a double pole switch 154 and trip 156 mounted on the branch 92 as shown in FIGS. 10 and 11. The trip 156 is on the underside of the switch block and cannot be operated until it is brought to bear upon a plate 158 beneath it mounted on the horizontal plate 114, and until the stylus pin is entered into the copy groove the arm cannot be depressed far enough to bring the trip into contact with the plate 158. Once the trip 156 is brought into engagement with the plate 158 a circuit is completed through a motor M2 (FIG. 4), which as will appear hereinafter, effects operation of means for drawing the flat bar 58 and hence the cutting tool into contact with the plate to be engraved, holds it in contact therewith during the engraving operation, and then releases it as the stylus is lifted upwardly so that the springs 64 return the cutting tool to its elevated position prior to withdrawal of the stylus pin from the copy groove; the stylus pin not being lifted clear of the groove until the arm is raised a distance to bring the top of the branch 94 in contact with the head 140.

Figure 4:
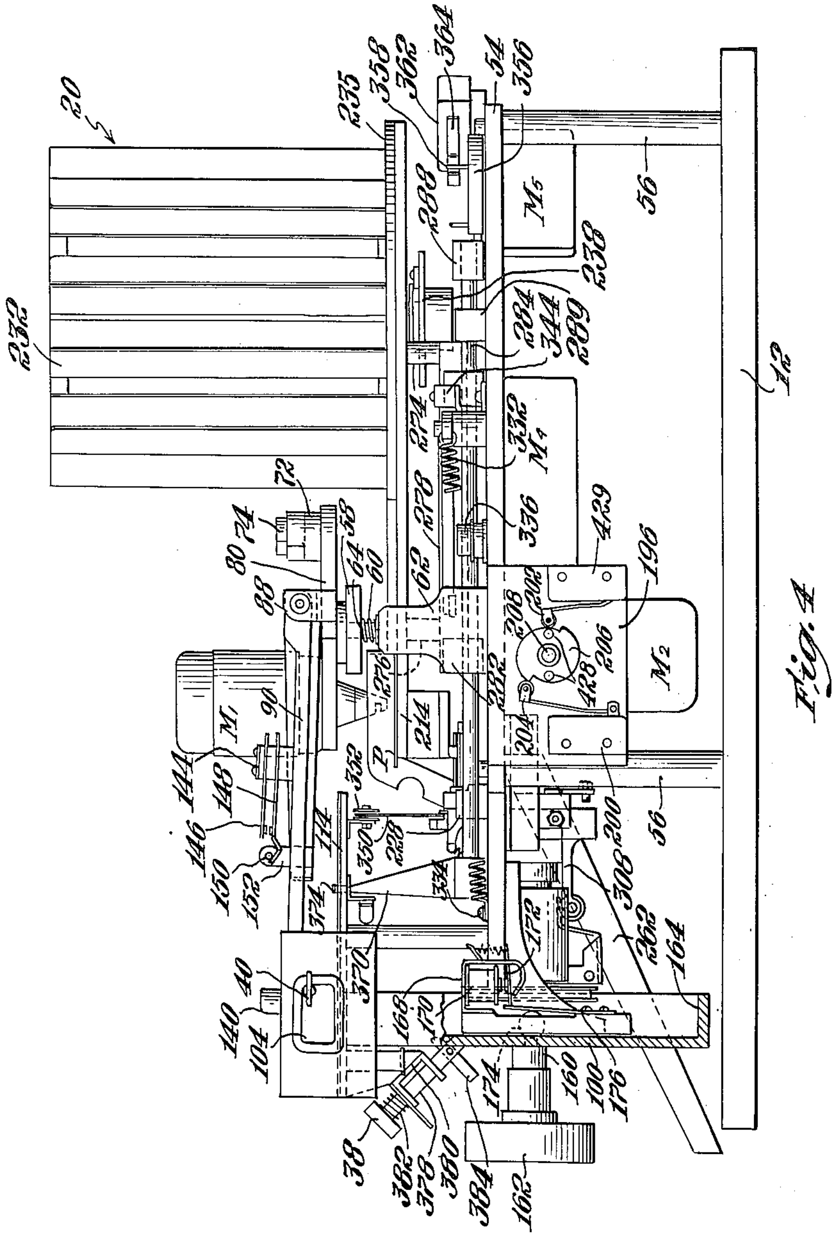
FIG. 4 is a side elevation of the machine with the housing removed as seen from the right-hand side of FIG. 3.

The copy disk 100 (FIGS. 4, 5 and 6) is mounted on a horizontal shaft 160 and is rotated about its horizontal axis by a knob 162 fastened to the shaft. The disk has a flange 164 (FIG. 4) in the peripheral surface of which is distributed in suitably spaced relation copy in the form of letters of the alphabet and the numerals from 0 to 9 and by rotation of the disk successive indicia may be brought into a position for cooperative engagement with the stylus. In order to prevent accidental rotation of the copy disk during an engraving operation and also to prevent rotation except when the machine is actually being used for the purpose of engraving, locking means is provided. To this end in the face of the disk there are formed a series of holes 166 (FIG. 6) corresponding in number to the indicia on the rim with which may be engaged a locking ball 174 (FIG. 4). The ball 174 is mounted at the rear side of the disk so as to have contact with the rear side of the disk at the line of the holes. The inner ends of the holes are enlarged so as to receive a substantial portion of the ball and the latter is yieldably held in contact with the rear face of the disk by a flat spring 176 so that when the disk is rotated the ball rolls freely between the disk and the spring. The disk is locked by forcing the ball into the enlarged end of a given hole. To this end at the inside of the disk there is fastened a bracket 168 to which is secured a solenoid 170 and clapper 172. When the solenoid 170 is de-energized the clapper 172 is drawn downwardly by a spring at one end thereby to lock the ball firmly in position by restricting movement of the leaf spring. When the solenoid 170 is energized, however, the clapper 172 is drawn upwardly releasing the leaf spring 176 and thus allows the copy disk to move freely. The solenoid circuit is connected to the primary circuit of the machine as will be shown hereinafter so that locking takes effect when the stylus is within the copy groove and also when the machine is idle.

In order to visually indicate the indicia which is in position for copy the plate 114 (FIG. 3) has in its upper surface a transversely extending slot 180 along which there is a movable pointer 182 and along one margin of which is a scale 184 on which is printed the indicia in the order of their occurrence. The pointer 182 is traversed by a flexible cord (FIG. 6) having a horizontal run 185 located just below the plate which is entrained about pulleys 186 and 188 journaled on the underside of the plate, a vertical run 190 which extends downwardly about a pulley 178 fast to the copy disk and a run 192 extending upwardly from the pulley 178 and across a pulley 194 to the pulley 186, the cord being continuous so that rotation of the copy disk in either direction will traverse the pointer 182.

Figure 12:
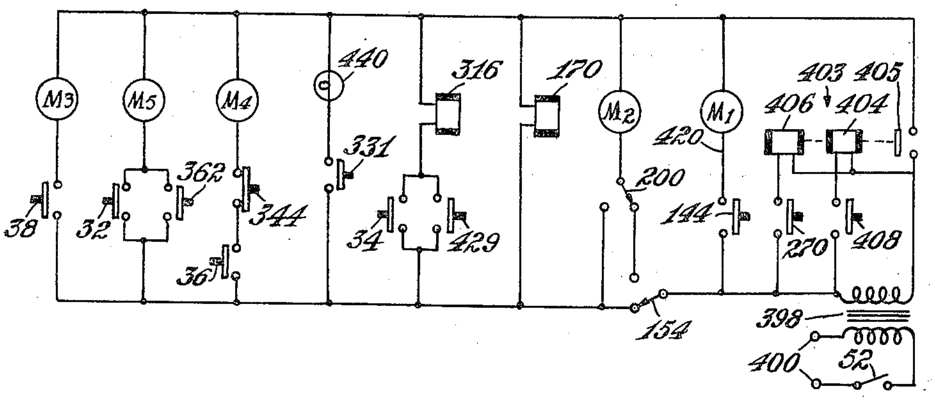
FIG. 12 is a wiring diagram of the electrical circuit, motors, switches etc. for effecting operation of the machine.

In order to lower the cutting tool slowly into contact with the plate to be engraved and conversely to raise it abruptly so that there is no chance of scarring the plate and so that clean, sharp cuts will be obtained, a cam blade is employed. To this end (FIG. 4) a bracket 196 is made fast to the chassis 54 so as to project downwardly therefrom and provides support for a switch 200 having a contact arm 204. The contact arm 204 bears against a cam disk 206 fastened to a shaft 208. The shaft 208 is rotated by the motor M2 and projects horizontally beneath the chassis 54 to the opposite side of the machine, the further end being suitably supported in a bearing stirrup 210 (FIG. 5). The shaft 208 is flattened to provide two cam blades 212 which in one position lie flat against the arm 66 and in another position with one edge engaged with the arm 66. When the flats of the cam blades contact the arm 66 the flat bar 58 occupies its elevated position. However, when the cam blades 212 are rotated to bring an edge into contact with the arm 66 the flat bar 58 is drawn down to its lowermost position. The cam disk 206 at the opposite end of the shaft 208 has two lobes or shoulders disposed 180° apart with which contact arm 204 is engaged. The switch 200 is a double-pole switch and, as explained hereinafter with reference to the circuit diagram of FIG. 12, is arranged so that, when the arm is lowered and the switch 154 is actuated, the motor M2 will draw current through one side of the switch 200. The motor will continue to operate until switch 200 is actuated by the contact arm 204 riding up the sloping side of one of the shoulders on the cam disk 206, the cutting tool at the same time being lowered slowly into engagement with the plate. The apparatus remains in this state while the engraving process itself is carried out by tracing the convolutions in the copy disk 100. The adjustment of the switch 200 is such that the motor M2 stops as the contact arm 204 is immediately adjacent the sharp shoulder of the cam disk 206 and the arm 66 is immediately adjacent the edge of the cam blade 212. When the arm is raised after finishing a character, thereby returning the switch 154 to its original condition, the motor M2 is again supplied with current through the other side of the switch 200 and the rotation of the shaft 208 thereby produced will release the arm 66 from the cam blade 212 whereupon the spring 64 will snap the flat bar 58 upwardly carrying the cutting tool with it, the tool thereby being withdrawn from contact with the plate before the stylus is completely lifted out of the copying groove. This snap action is produced by having the arm 66 extend away from the cam blade 212 in a direction opposite the rotation of the shaft 208 so that, as the cam blade 212 rotates, the arm 66 is first slowly lifted, thereby lowering the cutting tool, but then falls off the edge of the cam blade 212 as the cam blade reaches its on-edge position. The shoulder on the cam disk 206 is angularly displaced with respect to the edge of the cam blade 212 so that immediately following the tripping of the arm 66 the contact arm 204 drops off a shoulder of the cam thereby stopping the motor M2 by returning the switch 200 to its original position, that position being the one shown schematically in the circuit diagram of FIG. 12.

Figure 9:
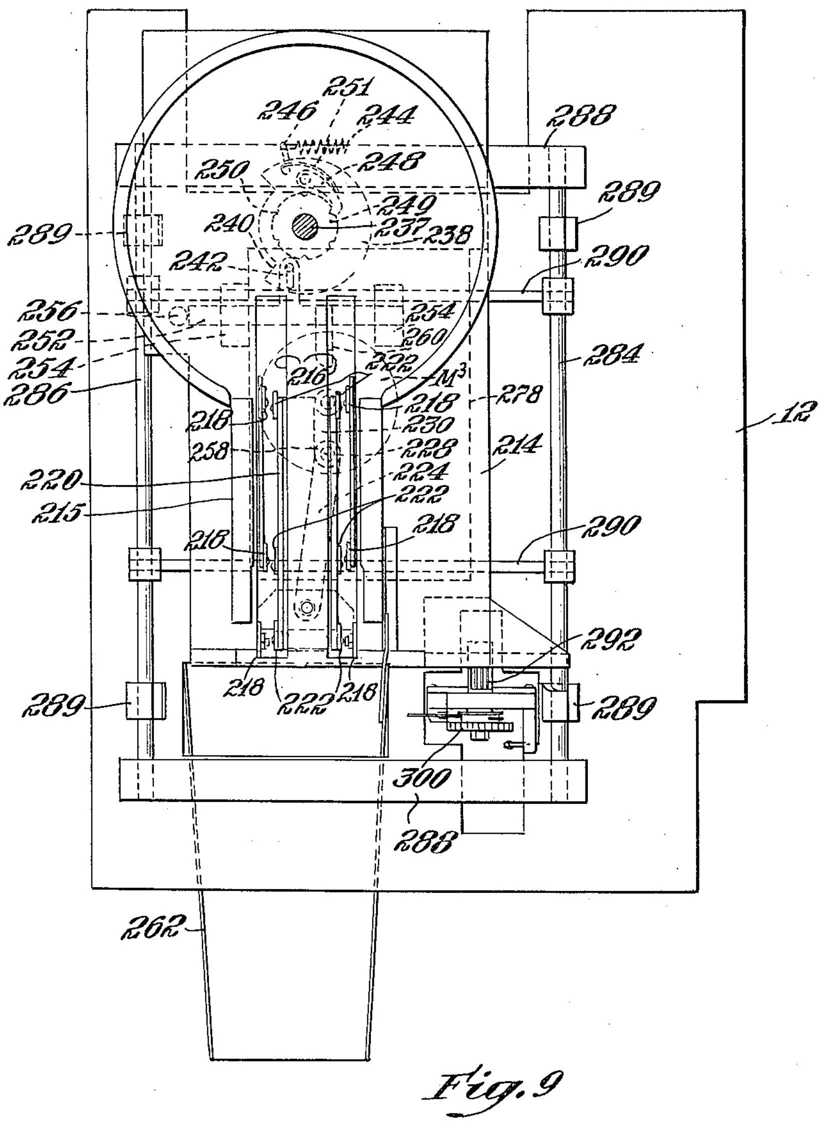
FIG. 9 is a plan view of the machine with the housing removed and with the magazine and pantograph mechanism omitted.

The plate to be engraved indicated at P (FIG. 4) rests upon a horizontal support 214 between spaced parallel guide 215 (FIGS. 3 and 9) which are spaced so that the ends of the plate may slide between them. The support 214 has between the guides 215 a pair of spaced slots 216 (FIG. 9), cut through the plate, and on the outer edges of the slots adjacent to the guides 215 are pivotally mounted weighted latches 218, these latches being fixed with reference to their position in the slots. Beneath the support 214 is a movable feed plate 220 (FIG. 5), the edges of which project laterally into the slots 216 and have on them pivoted, weighted latches 222. A link 224 is pivotally connected at 226 to the forward end of the feed plate 220 and is connected at its opposite end at 228 to an arm 230. The arm 230 is made fast to the shaft of a motor M3 and is rotatable thereby to reciprocate the feed plate 220 forwardly and rearwardly. The feed plate and its weighted latches operate in conjunction with the fixed latches to advance plates P to be engraved one at a time forwardly from a magazine constituting part of the plate transfer 20 to the place of engraving below the cutting tool. The operation constitutes a rearward movement of the feed plate 220 which carries the latches 222 beneath a plate P at the bottom of the magazine as will be described hereinafter, to the rear edge thereof, whereupon the latches rise into contact with the rear edge. Forward movement of the feed plate thereupon advances the plate P caught by the latches forwardly until it comes into contact with the first set of fixed latches 218. Upon the next rearward movement of the feed plate another plate P is removed from the magazine and the previous plate is advanced into contact with the next set of fixed latches. There are three sets of latches, the last set being located in a position beneath the cutting tool and the plates P are stepped forward in succession from the magazine until they reach the position of engraving. At this point the plate P is locked between the latches on the movable plate and the latches on the fixed support 214 so as to hold it firmly and immovably during the engraving operation. Locking is provided by two weighted latches located at the front end of the feeding channel. A spring loaded cam mounted at the forward end of the feed plate moves the weighted latches against the front edge of the plate P. The feed plate linkage is arranged so that the forward movement thereof is stopped just before it reaches the extremity of its forward movement by interrupting the circuit of the machine so that when the machine is re-energized the motor which effects operation of the linkage will be operated just long enough to complete forward movement of the feed plate and thus to bring the latches carried by it up against the rear edge of the plate P to lock it against the front latches on the support 214.

The magazine (FIGS. 3, 4 and 5) consists of a series of vertically arranged hoppers 232 of substantially rectangular cross section which are fastened to the sides of a hexagonal frame 234, the latter being fixed to a circular base plate. Each of the hoppers 232 is open at the front side, that is, has a gap 236 therein to permit ease of replenishing the hoppers with the plates P and for moving the plates therefrom if necessary. The base plate 235 is mounted for rotation about a vertical axis on a shaft 237 which passes downwardly through the support plate 214 and has mounted on it a disk 238 (FIG. 9), the latter being free to turn on the shaft. The disk 238 has a radially extending shoulder 240 which is normally held in contact with a lug 242 projecting rearwardly from a horizontally arranged slide bar 252 mounted for sliding movement transversely of the machine in bearing bosses 254. The slide bar 252 is normally held against a stop 256 by a spring, not shown, and has on its opposite or forward side a lug 260 which is located above the upper surface of the arm 230 and within the radius of the end of the arm 230 as it travels about its center of rotation. The pivot pin 228 has an upwardly projecting head 258 (FIG. 5) which strikes the lug 260 and moves it toward the right thereupon pushing the disk 238 in a counterclockwise direction. The disk 238 is normally urged in a clockwise direction by a spring 244 fast at one end to a pin 246 projecting from the disk and at its other end to a fixed point on the support 214 so that after the slide bar 252 returns to its inoperative position as the head 258 moves away from it the disk 238 will be returned to its initial position. A pawl 248 is pivotally mounted on the disk 238 and has an end which bears against a collar 249 fast to the shaft 237 in which there are notches 250 corresponding in number to the number of hoppers 232. The pawl is adapted to engage a given notch and to be held therein by a leaf spring 251. As thus constructed each time the feed plate 220 is moved rearwardly the slide bar 252 is moved transversely turning the disk 238 counterclockwise which carries with it the pawl 248 thus dragging the collar 249 in a counterclockwise direction so as to rotate the shaft 237 and hence the hopper counterclockwise to bring one of the hoppers into a position opposite the inner end of the reciprocating feed plate 220. The linkage is proportioned so that the hopper rotates and comes to a stop before the latches at the inner end of the feed plate 220 reach their innermost position.

After engraving the engraved plate is ejected and delivered by gravity to the plate discharge opening 44 at the front of the machine so that it may be retrieved. To this end a chute 262 (FIGS. 5 and 6) is mounted in an inclined position with its upper end close to the place of engraving and its lower end located in the mouth of the opening 44. A dummy floor 261 in the chute 262 is pivotally balanced at its upper end on a leaf spring 264, the end of which is pivoted at 268 on a switch block 270. The spring at the forward side of the pivot rests on the trip 272 of the switch block. Normally the trip 272 holds the dummy floor in the chute 262 elevated slightly but when a plate P falls into it and slides down toward its outer extremity, the added weight of the plate suffices to depress the trip 272 and thus to interrupt the primary circuit of the machine until it is restored by placing another coin in the coin slot.

The support 214 including the magazine and plate transferring mechanism is mounted for rectilinear movement so as to provide for spacing letters transversely along a line and to space the lines vertically on the plate. To this end the support 214 is made fast to posts 274 and 276 (FIG. 4), these in turn being made fast to a carriage plate 278 (FIG. 4). The carriage plate has bearing bosses (not shown) at its four corners which are slidably mounted on spaced, parallel, transversely extending rods 290. The rods 290 are fastened at their ends to spaced, parallel, longitudinally extending rods 284, the opposite ends of which are joined by transversely extending bars 288 which join them rigidly so as to form a carriage frame. The carriage frame is mounted for slidable movement forwardly and rearwardly in bearing blocks 289 mounted on the chassis 54. As thus constructed, the support 214 is movable transversely and longitudinally.

Figure 7:
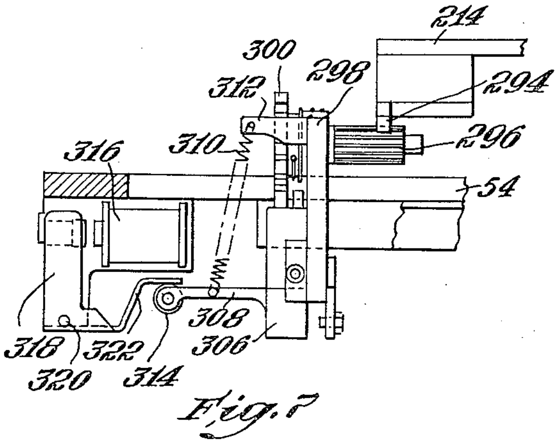
FIG. 7 is a fragmentary elevation of the carriage traversing mechanism.
Figure 8:
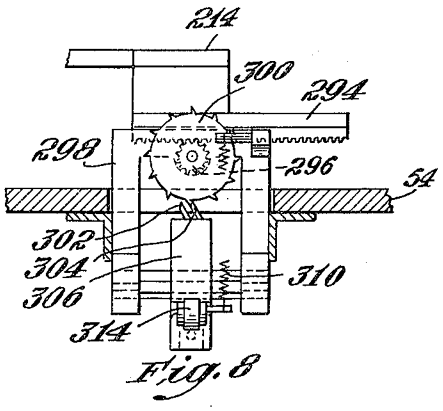
FIG. 8 is an end elevation of the carriage traversing mechanism.

Transverse movement of the support 214 to effect spacing of the letters along a line is effected by a release mechanism illustrated in FIGS. 7 and 8, which includes a rack bar 294, fastened to the underside of the forward edge of the support 214 and a meshing tooth gear 296. The gear is mounted on a horizontal shaft journaled in a bracket 298 fast to the chassis and has fast to it forwardly of the bracket a ratchet wheel 300. A pair of spaced pawls 302 and 304 are fastened to a slide 306 which is mounted for vertical movement on the face of the bracket 298. The lower end of the slide has a horizontally, forwardly projecting arm 308 and the upper end of the bracket has a horizontal, forwardly extending arm 312. A coiled spring 310 is stretched between the arms 308 and 312 and normally serves to hold the slide 306 in an elevated position so that the right hand pawl 304 (FIG. 8), engages one of the teeth in the ratchet wheel 300, the other tooth 302 lying to the left thereof. A spacing solenoid 316 is fastened to the chassis adjacent the bracket and has a bell lever clapper 318 pivoted at 320, so that upon energization of the solenoid 316 the clapper will be rocked on its pivot. The lower arm of the clapper has a finger 322 which rests on a roller 314 at the end of the arm 308. When the solenoid is energized the clapper rocks in a clockwise direction, depressing the finger 322 and hence forcing the arm 308 downwardly against the action of the spring 310. When the slide 306 is moved downwardly the pawl 304 is moved out of engagement with a tooth on the ratchet wheel leaving it free to turn. Turning movement however is limited by return of the slide to its upper position whereupon the tooth 302 is engaged with the succeeding tooth on the ratchet wheel. The support 214 is normally urged toward the left by spring pressure so that the ratchet and ratchet wheel merely serves to release the support for a sufficient length of time to permit it to move under the influence of the spring pressure, the distance of the spacing between a pair of teeth on the gear 296. The spring pressure is applied by a lever 324 (FIG. 3) pivoted at 326 so that its forward end 328 bears against the edge of the support 214. The toe of the lever is provided with a hook 330 on which is placed one end of a coil spring 332, the opposite end of which is stretched forwardly and anchored to the chassis 54 at 334 (FIG. 4). As the carriage travels transversely of the machine it reaches a limit imposed by contact with a stop which prevents further movement thereof and at the same time contacts a microswitch 331 (FIG. 3) which energizes a lamp, the lighting of which indicates that the carriage has reached its furtherest position and must be returned. Return movement of the carriage is effected by a spool 336 (FIGS. 3 and 4) mounted on a vertical shaft 338 which projects upwardly from the underside of the chassis 54, the lower end being connected for rotation to a motor M4. A cord 340 is connected at one end to the spool and at its opposite end to the underside of the carriage plate 278 so that rotation of the spool takes up the cord and draws the latter to the right as seen in FIG. 3. As the carriage plate travels to the right the lever 324 is turned in a counterclockwise direction about its pivot and when the carriage plate has reached its furtherest right hand position the toe of the lever depresses a trip 342 on a microswitch 344 thus breaking the circuit to the motor M4 so that the spool ceases to rotate. Transverse movement of the carriage plate 278 is indicated on the plate 114 (FIG. 3) by a pointer 346 which moves transversely along a slot 348 formed therein. The pointer 346 is traversed along the slot 348 by a cord 350 (FIGS. 4 and 5) mounted on spaced pulleys 352 so that for each stepping of the carriage the pointer is moved one space along the scale thus clearly showing to the operator at any particular time the proportionate position of the particular indicia being engraved with respect to the width of the plate. The left hand end of the cord has attached to it a weight W to take up slack when the carriage plate moves to the left and to give it up when it's moved to the right.

Longitudinal movement of the carriage to permit line selection is effected by a cam 356 (FIG. 3) which is fast to the shaft of a motor M5 (FIG. 5). The edge of the cam bears against the rear edge of the carriage frame and as it rotates forces the carriage frame forwardly in opposition to the tension in a spring 354 which is fastened to the carriage and to a fixed point on the chassis in such a manner as to normally hold the carriage in its rearmost position. The cam is so shaped that upon rotation it will permit the carriage to move rearwardly for line spacing and then return it to its initial forward position. The cam has on it three equally spaced upright pins 358. Adjacent to the cam is a switch 362 having an operating arm 364 which lies in the path of rotation of the pins as the cam rotates. As hereinafter explained with reference to the circuit diagram of FIG. 12, the motor M5 may be energized by the closing of either the push button 32 or the microswitch 362. Pushing the button starts the motor and a parallel circuit through the microswitch 362 is adapted to keep it going until the next line is reached. The position of each line corresponds to the respective point of rotation of the cam 356 at which the associated pin 358 releases contact with the arm 364 of the microswitch 362. The arrangement is further such that the next pin 358 in order is left immediately adjacent the arm 364 so that the first bit of rotation after the push button 32 is actuated will close the microswitch 362. Thus a short push on the button 32 will initiate a complete line-changing cycle. In order to permit adjustment of the lines, that is to relocate the lines as a whole between the top and bottom of the plate the microswitch 362, switch arm 364 and motor M5 including the cam are mounted on a cam bar 360 pivoted at 366 on the chassis 54. Hence by swinging the cam bar 360 the position of the cam will be changed and will thus provide for line spacing with reference to the carriage.

Forward and rearward movement of the carriage for line spacing is recorded by a pointer 374 (FIG. 3) mounted for movement in a gap 372 in the plate 114. A scale 376 indicates the line spacing. The pointer 374 is mounted at the upper end of a bracket plate 370 (FIG. 4) fastened to the forward end of the carriage frame.

The push buttons heretofore indentified as 32, 34, 36 and 38 are located in the forward wall below the blister and are each mounted to prevent improper use. Each push button has a stem 378 mounted in a U-shaped bracket 380 as shown in FIG. 4, so that it may slide downwardly by application of pressure to its head. A spring 382 normally located directly beneath the head holds the push button in its inoperative position. At the lower end of the stem therein is pivotally mounted a latch bar 384 and on the bracket adjacent the lower end of the stem there is mounted opposite each button a microswitch 386 (FIG. 5) so placed that its trip 388 lies in the path of the latch bar 384. As the buttom is depressed the latch bar will contact the trip 388 and complete a circuit through the switch but if the button is depressed further or jammed down and held the latch bar 384 will ride by the trip and release it. When the push button is released the latch bar 384 will ride by the trip without again operating it since the latch bar 384 is pivoted and is light enough to be cammed out of the way as the button returns to its normal position.

The circuit diagram for operating the machine is illustrated in FIG. 12. Referring to the circuit diagram the apparatus is supplied with current by way of a transformer 398 which is connected by leads 400 to a source of power, one of the leads having a line switch 52 therein, operation of which completes the circuit from the source of power to the transformer. While, as actually constructed herein, 24-volt motors and relays are employed throughout and hence a transformer is used to reduce the line current of the 110-volt house current to 24-volts, it is not intended that this shall be limiting since by the use of 110-volt motors and relays in place of the 24-volt the apparatus may be connected directly to a 110-volt line without the interposition of the transformer.

In the circuit between the transformer and the rest of the apparatus, is placed a solenoid-operated switch 403 having contacts 405. The switch is of the type which will remain indefinitely in the condition in which it is left and has a solenoid 404 for closing the contacts and a solenoid 406 for opening the contacts. The contact closing solenoid 404 is arranged to function when the normally-open switch 408 is closed by a coin. Power is thereby made available to the rest of the apparatus through the contact 405 and will continue to be available until a finished plate is ejected thereby momentarily closing the normally-open switch 270 and actuating the contact opening solenoid 406.

Drawing current from the transformer 398 are five motors: M1, M2, M3, M4 and M5. The motor M1 is connected across the power circuit by a conductor 420 in which is interposed the leaf microswitch 144 heretofore described as mounted on the stylus arm 90 (FIG. 4). As the stylus arm 90 is lowered to bring the stylus pin into contact with the copy groove the contact 148 is lowered out of contact with the pin 150 so that it flexes into contact with the contact 146 thereby completing a circuit to the motor M1 so as to initiate operation thereof. This circuit is disconnected by restoring the arm to its upper position. After the engraving motor M1 is started further downward movement of the stylus arm trips the microswitch 154 to the position opposite that shown in the circuit diagram of FIG. 12 so that current is supplied through the switch 200 to the motor M2. This initiates operation of the motor M2 thereby lowering the cutting tool slowly into contact with the plate to be engraved. The motor M2 will be stopped with the cutting tool in its lower position by the operation of the switch 200 as explained previously with reference to FIGS. 4 and 5. This latter operation of the switch 200 will move it into a position opposite that shown in the circuit diagram of FIG. 12. It is with the circuit in this condition that the engraving process itself is performed by following the convolutions of the copy with the stylus arm. It should be noted that during this process power is cut off from the rest of the apparatus by the arrangement of switch 154 and that the lack of current through the solenoid 170 allows the copy disk 100 to be locked by the ball 174.

When the particular character is finished and the stylus arm is again raised the switch 154 will return to the position shown in the circuit diagram restoring power to the rest of the circuit and unlocking the copy disk. As the switch 200 is at this point still in a position opposite that shown in the circuit diagram the motor M2 will immediately restart and continue to run until the arm 204 runs off the shoulder of the cam 206 (FIG. 4) thereby returning the switch 200 to the position shown in the circuit diagram.

To provide for the automatic spacing of the letters for each engraving operation, a microswitch 429 is connected in series with the spacing solenoid 316, the solenoid 316 being adapted to release the carriage for transverse movement under the influence of the spring-stressed lever 324. The microswitch 429 is located on bracket 196 and is actuated with each complete cycle by one of the two steel pins 428 on the cam disk 206 thereby delivering an impulse to the spacing solenoid 316. Manual stepping of the carriage across the machine for spacing the letters is acorded by the push button switch 34 which is connected electrically in parallel with the microswitch 429. In order to supply a visible indication that the carriage is at its left-most position there is provided a caution light 440 located directly below a red glass window in the instruction plate. This caution light is supplied with current through the microswitch 331 which is located so as to be actuated by the carriage as the carriage reaches its left-most position. The carriage may be traversed to the right by means of the motor M4 which may be actuated by the back spacer push button 36. Jamming of the motor is prevented by the normally closed microswitch 344 which is opened by contact with the carriage when the carriage reaches its right-most position and which is electrically in series with the push button switch 36.

Line selection is accomplished by the motor M5 operation of which may be initiated by the push button 32. The cam 356 which is driven by the motor M5 is arranged so that the first bit of rotation will bring a pin 358 into contact with the operating arm 364 thereby closing the switch 362 which is electrically in parallel with the push button switch 32. This operation insures that the motor M5 will continue to run until the particular pin 358 slides off the end of the operating arm 364, that position of the cam 356 corresponding to one of the three spaced lines of indicia as explained hereinbefore with reference to FIG. 4. Successive pressing of the push button will step the cam around to space the carriage for line spacing and return the carriage to its initial position.

The motor M3 effects operation of the plate transfer or delivery means for delivering plates from the magazines and also for rotating the magazines as explained with reference to FIGS. 3, 4, 5, 7, 8 and 9. This motor is provided with current through the push button switch 38. The motor M3 may be kept running by operation of the push button 38 until a finished plate is discharged onto the chute 262 actuating the switch 270 which cuts off the supply of current to all parts of the apparatus by effecting the operation of the contact-opening solenoid 406.

In the operation of the machine as thus described if the machine is coin operated a coin of appropriate value is dropped into the coin slot 26 thus energizing the primary circuit by way of the solenoid operated switch 403. The first operation to take effect upon energization of the primary circuit is a very slight rotation of the motor M3 which straightens the linkage 224—230 moving the transfer slide 220 to its furtherest forward position thus causing the latches 222 carried by the transfer plate to press against the rear edge of the plate P and force its forward edge into locking engagement with the front latches 218. The machine is now ready for operation, the copy disk having also been released by energization of the primary circuit. The operator now selects the copy desired by rotation of the disk to the proper position below the stylus, shifts the carriage either transversely or longitudinally so as to locate the first letter or number of the composition which he is to make at the proper position on the plate P and then grips the stylus handle and brings the stylus pin into engagement with the copy. By moving the stylus about the copy the cutting tool is caused to cut a corresponding indicia on the plate. Following completion of the engraving the stylus is lifted and the carriage automatically shifts transversely a single spacing for the next indicia whereupon the operation is repeated for a similar or different letter or number. When the entire composition is completed the operator pushes the plate ejector button 38 whereupon the transfer means ejects the finished plate P and delivers a fresh plate to the place of engraving. It is evident from the circuit explained heretofore that the push button control permits traversing the carriage laterally and longitudinally, independently of each other and even at the same time without fear of damage. Moreover, while the circuit is described as being coin controlled if the machine is to be used in an establishment where only an employee will operate the machine as distinguished from the general public who will make plates in accordance with orders received from customers, the switch 403 may be replaced by a manually operable switch so that it may be closed and opened at will.

The aforesaid machine has distinct advantages over prior apparatus in that plates may be made rapidly, accurately and conveniently right at the place of sale so that customers may be supplied quickly with a name plate or tag without having to wait as is currently required where it is necessary to send the plate out to a professional engraver. Moreover, the machine being adapted to coin operation can be placed in local stores and operated by customers. The machine being foolproof and tamperproof is of sturdy and durable construction and under ordinary circumstances will function for prolonged periods without servicing and without customer complaint.

It should be understood that the present disclosure is for the purpose of illustration only and that this invention includes all modifications and equivalents which fall within the scope of the appended claims.

I claim:

1. In an engraving machine a fixed support for holding the plate to be engraved, a movable support arranged to be moved to and from the fixed support, a pantograph pivotally mounted on the movable support and movable therewith to and from the fixed support, said pantograph having quadrilaterally arranged, pivotally connected arms, a copy stylus and cutting tool mounted on such arms of the pantograph that movement of the arm on which the stylus is mounted will effect a corresponding movement of the tool, a copy, means pivotally supporting the stylus on the pantograph for movement independently thereof to and from the copy to engage it with the copy for tracing the copy, cam means movable from an inoperative position to an operative position to effect movement of the movable support to bring the tool into cutting engagement with a plate on the fixed support, a motor operably connected to the cam to effect operation thereof, a circuit for exciting the motor, a switch element in the circuit mounted on the stylus arm operable following contact of the stylus with the copy to close the circuit and hence to excite the motor so as to move the cam into operative position, and means operable to break the motor circuit when the cam reaches its operative position, said switch being operable preceding disengagement of the stylus with the copy to re-energize the motor to move the cam to an inoperative position, said last-named means being operable to again break the motor circuit when the cam reaches its inoperative position.

2. In an engraving machine according to claim 1, a motor for effecting rotation of the cutting tool, a switch therefor carried by the stylus arm, said switch for the motor which drives the tool and the switch for effecting operation of the motor for moving the movable support, being operable in seriatim upon movement of the stylus into and out of contact with the copy.

3. In an engraving machine having pantograph arms carrying a copy stylus and cutting tool, a stylus arm pivoted at one end to the pantograph arms for movement in directions to depress the stylus into contact with the copy and to elevate it therefrom, means operable by depression of the arm automatically to effect rotation of the tool and lower it into contact with the work, means operable by elevation of the arm to effect elevation of the tool and thereafter to stop its rotation and toggle means for yieldably holding the arm in one or the other of the two positions until purposely displaced by application of pressure thereto.

4. In an engraving machine having pantograph arms carrying a copy stylus and rotatable cutting tool, a two position stylus arm pivoted at one end on the pantograph for movement of its opposite end from a position elevated above the copy to a depressed position in contact with the copy, means operable by depression of the arm automatically to start rotation of the cutting tool and to bring it into engagement with the work and toggle means yieldably holding the arm in either one of said two positions.

5. In an engraving machine having pantograph arms carrying a copy stylus and cutting tool, a two position stylus arm pivoted at one end to the pantograph for movement of its opposite end from a position elevated above the copy to a depressed position in contact with the copy, means operable by depression of the arm automatically to start rotation of the tool and to bring it into contact with the work, a throw governing the displacement of the arm from one position to the other and yieldable means bearing against said throw, said throw having a dead center about which it turns and said yieldable means holding said throw at one side or the other of said dead center.

6. In an engraving machine a pantograph having arms carrying a copy stylus and a cutting tool, a support for a plate to be engraved, a support for the pantograph, stylus and cutting tool, movable to and from the plate support, spring means normally holding the support elevated from the plate support and a cam operable slowly to depress the support and rapidly to release said support for snap action return to its elevated position under the impulse of the spring means, and means operable by movement of the stylus into and out of engagement with the copy to effect operation of the cam.

7. In an engraving machine a pantograph having arms carrying a copy stylus and cutting tool, a support on which the pantograph is mounted, said support being mounted for vertical movement from an elevated position to a depressed position, stiff springs yieldably holding the support elevated, a shaft, a motor and circuit for effecting rotation of the shaft and a flat cam fast to the shaft, said cam having diametrically located blades movable by rotation of the shaft slowly to depress the support and means operable when the support reaches its depressed position to interrupt the motor circuit to hold the support depressed as long as the stylus is engaged with the copy.

8. An engraving machine according to claim 7 wherein the cam has a drop-off between blades so that as the extremity of each blade in turn moves out of contact with the support, the latter is released abruptly.

9. In an engraving machine a pantograph having arms carrying a copy stylus and a cutting tool, a support for a plate to be engraved, means operating on the rear edge of the plate for delivering plates successively to the plate support in response to signals, means at the support for engagement with the leading edge of the plate cooperable with the plate delivery means for locking the plate at said support, a circuit and power operated means included therein for effecting operaton of the component parts of the machine, said delivery means being controlled by said circuit normally to advance the plate into locking engagement with the means at the plate support between the time the circuit is initially energized and the time the signal is given to deliver another plate.

10. In an engraving machine, a pantograph having arms carrying a copy stylus and a cutting tool, a support for the plates to be engraved, spaced parallel tracks slidably receiving the ends of the plate for guiding them to the plate support, plate feeding means for pushing the plates successively along said track to said plate support in response to a signal, said tracks extending along opposite sides of the plate support so that the ends of the plates are constrained against lateral movement on the plate support by the tracks, positioning latches for limiting forward movement of the plate on the plate support, feed latches on the plate feeding means engageable with the rear edge of the plate to advance it into contact with the positioning latches to grip the plate between the latches, said plate feeding means being operable at its feed position to mobilize the positioning latches.

11. In an engraving machine a pantograph having arms carrying a copy stylus and cutting tool, a support for a plate to be engraved, a magazine for holding a quantity of plates, a plate transfer for withdrawing plates from the magazine and moving them successively to the plate support, said transfer including a fixed slide having parallel slots therein on which the plates rest, and a movable slide reciprocal between the magazine and the plate support, said movable slide having latches thereon protruding through the slots in said fixed slide, said latches being engageable with an edge of the plate, and means for effecting intermittent reciprocation of the movable slide to advance the plates one at a time to the plate support.

12. An engraving machine according to claim 11 wherein there is means responsive to a manual signal to back space said carriage traversing means.

13. In an engraving machine, a pantograph having arms carrying a copy stylus and a cutting tool, a support for a plate to be engraved, a magazine and transfer means for delivering plates from the magazine to the plate support for engraving, a carriage supporting said magazine, said transfer means, and said support for bodily movement rectilinearly to permit lateral and longitudinal shifting of the support with reference to the cutting tool, a primary circuit containing means operable to effect movement of the carriage, movement of the magazine and transfer means and rotation of the cutting tool, individual push button controls arranged in said circuit to effect operation of said carriage, magazine and transfer means, and means operable by the movement of the stylus into contact with the copy to initiate operation of the cutter and to render said push button inoperative.

References Cited in the file of this patent

UNITED STATES PATENTS

| | | |
|---|---|---|
| 940,730 | Roovers | Nov. 23, 1909 |
| 962,439 | Kirk | June 28, 1910 |
| 1,471,869 | Turner | Oct. 23, 1923 |
| 2,007,819 | Tillett | July 9, 1935 |
| 2,058,637 | Scott et al. | Oct. 27, 1936 |
| 2,199,261 | Kapp et al. | Apr. 30, 1940 |
| 2,308,207 | Reinhard | Jan. 12, 1943 |
| 2,374,168 | Bowman | Apr. 24, 1945 |
| 2,381,657 | Gruettner | Sept. 13, 1949 |
| 2,562,269 | Gruettner et al. | July 31, 1951 |
| 2,645,161 | Stuart et al. | July 14, 1953 |
| 2,666,989 | Gunderson | Jan. 26, 1954 |
| 2,724,896 | Mich | Nov. 29, 1955 |

FOREIGN PATENTS

| | | |
|---|---|---|
| 528,946 | Great Britain | Nov. 11, 1940 |